(12) United States Patent
Seike et al.

(10) Patent No.: US 6,628,420 B2
(45) Date of Patent: *Sep. 30, 2003

(54) CUT-PAPER PRINTING TYPE FACSIMILE APPARATUS

(75) Inventors: Toshio Seike, Yamatokoriyama (JP); Toshiya Miura, Yamatokoriyama (JP)

(73) Assignee: Sharp Kabushiki Kaisha, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/358,765

(22) Filed: Jul. 22, 1999

(65) Prior Publication Data

US 2003/0137676 A1 Jul. 24, 2003

(30) Foreign Application Priority Data

Aug. 24, 1998 (JP) .......................................... 10-236805

(51) Int. Cl.⁷ .............................................. G06K 15/00
(52) U.S. Cl. ...................... 358/1.2; 358/1.12; 358/1.18; 358/1.15
(58) Field of Search ................................ 358/448, 449, 358/1.17, 1.3, 1.15, 1.2, 1.18, 1.12

(56) References Cited

U.S. PATENT DOCUMENTS

| | | | | |
|---|---|---|---|---|
| 4,631,596 A | * | 12/1986 | Yaguchi | 358/256 |
| 4,695,898 A | * | 9/1987 | Ishikawa | 358/296 |
| 4,977,463 A | * | 12/1990 | Fukuda | 358/448 |
| 5,148,295 A | * | 9/1992 | Matsubara | 358/451 |
| 5,150,224 A | * | 9/1992 | Mizude | 358/449 |
| 5,589,948 A | * | 12/1996 | Itezono | 358/449 |
| 5,602,651 A | * | 2/1997 | Tabata | 358/448 |
| 5,995,238 A | * | 11/1999 | Yu | 358/404 |
| 6,018,618 A | * | 1/2000 | Yoshida | 395/117 |

FOREIGN PATENT DOCUMENTS

JP        61292466        12/1986

* cited by examiner

Primary Examiner—Jerome Grant, II
(74) Attorney, Agent, or Firm—Birch, Stewart, Kolasch & Birch, LLP

(57) ABSTRACT

A cut-paper printing type facsimile apparatus can achieve saving in consumption of recording paper and shortening of printing time by using a simple method according to the present invention, which does not require an image storage device and, therefore, can be easily implemented in a popular type inexpensive facsimile apparatus to increase the efficiency of the apparatus with a reduced consumption of recording paper. A received image signal is expanded by a control device to a bit string of data to be printable as white-and-black dots. A signal indicating the end of one line is counted by a line counter of a memory device. Upon receipt of one transmitted page, the counted number of printed lines is compared with a preset specified value at which a cut-paper sheet must be delivered. If the counted value exceeds the preset value, the control device generates a paper-delivering instruction to the printed device. If the counted value is smaller than the preset value, the paper-delivering instruction is not given and the cut-paper sheet is held on a printing portion of the printer. Only a cut-paper sheet whereon lines not less than a preset value were printed is delivered, thus achieving a maximal use of a cut-paper sheet without leaving unused printing space thereon. The cut-paper sheet held on the printing portion is used for printing thereon a next page to be received.

11 Claims, 6 Drawing Sheets

CUT-PAPER PRINTING TYPE FACSIMILE APPARATUS

BACKGROUND OF THE INVENTION

The present invention relates to a facsimile apparatus and, more particularly, to a cut-paper printing type facsimile apparatus that can effectively produce a high-quality printed product on cut-paper (separate sheets of recording paper) by adopting a technique for effectively using recording paper and the apparatus for printing a received image on the cut-paper and delivering the printed product.

In conventional cut-paper printing type facsimile apparatuses, a page of a received image is printed on a sheet of recording paper or two sheets or more when a page of the received image is longer than that printable on a sheet at the receiving side. Such alternatives have been also known that a page of a received image is enlarged or contracted by various scaling methods to print on a formatted sheet at a receiving terminal or a plurality of pages of a received image is contracted to print on a sheet at the receiving terminal.

The conventional cut-paper printing type facsimile apparatuses uses a sheet of recording paper for printing a received image that is smaller than a printing area of the paper sheet or prints out a page of an image transmitted by a sender on a paper sheet irrespective of an amount of information contained therein. It means that a page transmitted by a sender, irrespective of its small content, is faithfully reflected on a sheet (i.e., as a page with a large used space) at a receiving terminal. This results in inefficient and uneconomical use of recording paper and the apparatus.

SUMMARY OF THE INVENTION

Accordingly, an object of the present invention is to provide a facsimile apparatus that prints a received image on a separate sheet of recording paper (so called "cut-paper sheet") according to a method for realizing the saving in consumption of recording paper and the reduction of a printing time with no need of using an additional image storage, which method, therefore, is easily applied to popular type facsimile apparatuses and increase the efficiency of using the apparatus and materials.

The saving in consumption of recording paper and the reduction of printing time in each facsimile apparatus can be realized by providing means for enabling a facsimile apparatus to print a plurality of received image pages on a single sheet of recording paper without using an image storage device.

Another object of the present invention is to provide a facsimile apparatus for printing a received image on a cut-paper sheet, which comprises printing means for printing on a cut-paper sheet a line image produced on the basis of a received facsimile signal, counting means for counting the number of lines of the line image printed or to be printed on a single sheet by the printing means, comparison means for comparing the printed line number counted by the counting means with the preset number of lines per sheet, wherein the printing means starts printing on a new page only upon receipt of a signal outputted by the comparison means when the number of lines printed on the current cut-paper sheet reached the preset value and a new cut-paper sheet is prevented from being fed until the number of lines printed on the current sheet reaches the preset value.

Another object of the present invention is to provide a facsimile apparatus wherein, when a page-end signal and/or a communication-end signal is inputted but the comparison means is outputting a comparison signal of showing the printed lines being less than the preset value, the printing means continues printing on a current cut-paper sheet a line image of a next received page and/or a new line image to be received through a next communication.

Another object of the present invention is to provide a facsimile apparatus wherein, in the case of printing on a current cut-paper sheet a line image of the next received page and/or the next communication, the printing means prints a specified image indicating the end of a page and/or the end of communication (e.g., a partition-line image) after the end of the received current page image and before starting printing of the next received page and/or the next received transmission so that the user may clearly recognize a boundary between two pages or two communications on the sheet by the dividing line image printed there between.

Another object of the present invention is to provide a facsimile apparatus that is further provided with instruction means for giving an instruction signal for instructing the printing means to execute the delivery of the printed cut-paper sheet prior to the above-described operation procedure on completion of receipt of information so that printed cut-paper sheet is delivered out of the apparatus to clearly indicate the end of the current communication.

Another object of the present invention is to provide a facsimile apparatus that is further provided with instruction means for give an instruction signal for instructing the printing means not to execute the delivery of the printed cut-paper sheet prior to the above-described procedure on completion of receipt of information so that printed cut-sheet may be held in the apparatus to reserve the adaptability to user's request for changing working conditions.

Another object of the present invention is to provide a facsimile apparatus that is further provided with a comparison means for comparing the number of printed lines counted by the counting means with the specified number of printed lines, which is preset as a reference value at which the delivery of printed cut-paper sheet is started, and an instruction means is provided to give an instruction signal for instructing the printing means not to execute the delivery of the printed cut-paper sheet on completion of the receipt of data if a comparison signal outputted from the comparison means shows the number of printed lines being smaller than the preset reference value. The above-described logic used for functioning of the facsimile apparatus of the present invention is applied to a time point of the end of the current facsimile communication, thereby saving in the consumption of a cut-paper sheet of recording paper for recording thereon two facsimile communications.

Another object of the present invention is to provide a facsimile apparatus that is further provided with a timer for generating a signal to start the delivery of a remaining cut-paper sheet with an elapse of a specified time duration after giving an instruction prohibiting the delivery of the cut-sheet, thus realizing the delivery of the printed-and-held cut-paper sheet from the apparatus when a specified time elapsed after the completion of receipt of information.

Another object of the present invention is to provide a facsimile apparatus that is further provided with an input means for inputting a command for delivering a printed cut-sheet, which forces the printing means to deliver the printed-and-held cut-paper sheet from the apparatus. This enables a user to operate the apparatus to deliver the remaining cut-paper sheet therefrom as necessary.

PREFERRED EMBODIMENT OF THE INVENTION

Figure 1:
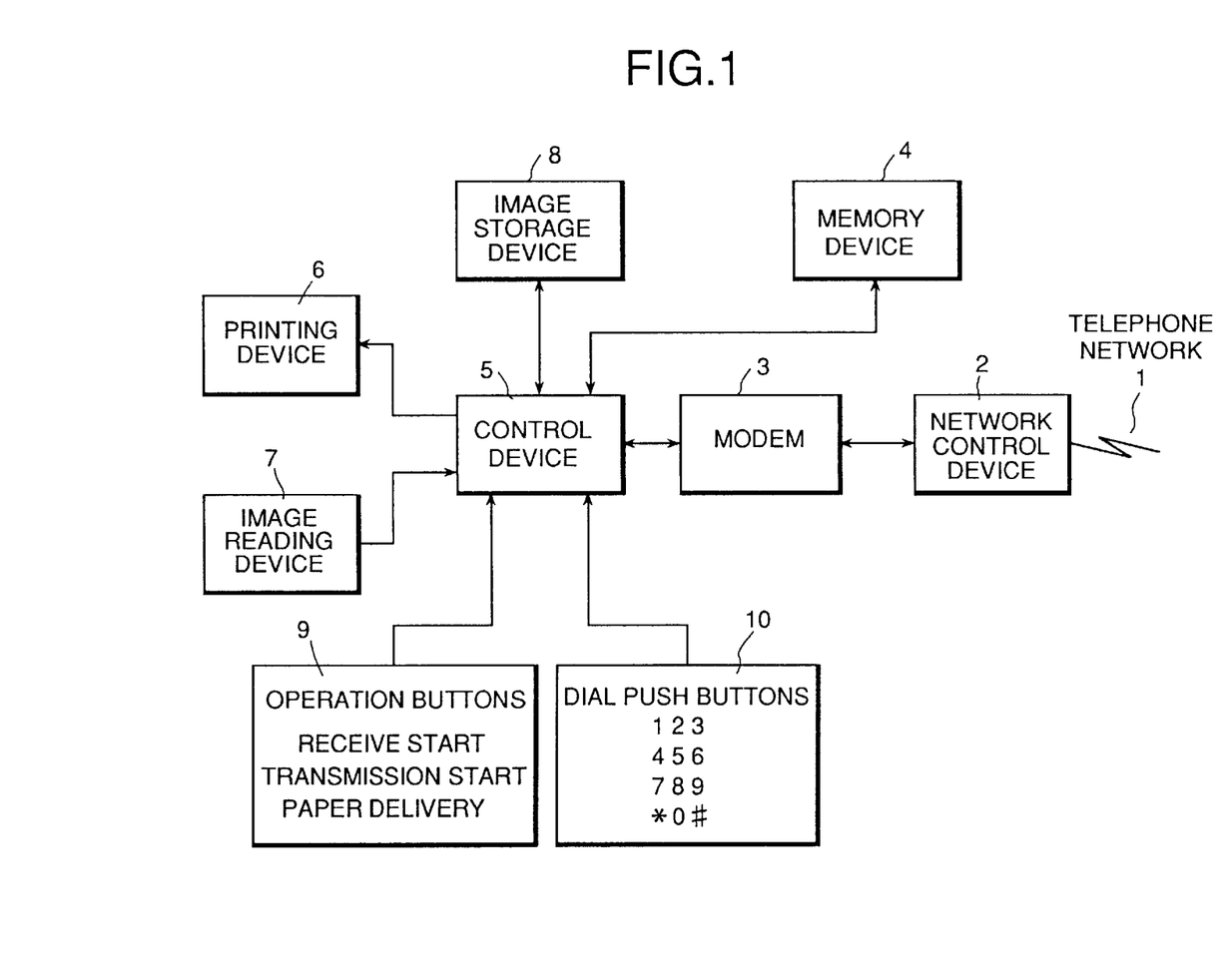
FIG. 1 is a schematic block diagram showing a construction of a facsimile apparatus according to the present invention.

Referring to accompanying drawings, a cut-paper printing type facsimile apparatus embodying the present invention will be described as follows:

FIG. 1 schematically illustrates an exemplified construction of a facsimile apparatus according to the present invention.

As shown in FIG. 1, the facsimile apparatus is connected to another distant facsimile apparatus over a telephone network 1. In case of receiving image data from the distant (sending) terminal, the facsimile apparatus first prepares itself according to a specified communication protocol and then receives an analog signal bearing image data, which was transmitted over telephone network 1 and input to a modem 3 through a network control device 2.

The modem 3 demodulates the input analog signal in the compressed state and transfers it to the control device 5 that in turn expands the demodulated compressed signal to a bit map (1, 0) so that an image is represented with black-and-white dots suitable to print. The expanded signal is then transferred to a printing device (printer) 6 by which it is printed on a cut sheet of recording paper. Generally, printers are classified into two groups: one uses a continuous form such as roll paper and the other uses a cut form such as recording paper previously cut to a separate specified format. The facsimile apparatus according to the present invention prints received image data on a cut-paper sheet. Types of printers suitable for printing transmitted data on cut-paper sheets are laser printers, ink-jet printers and thermoelectric printers.

The image reading device 7 is used for reading an image of an original to be transmitted or copied and constitutes an image input portion to be operated by a user of the apparatus. A group of control buttons 9 and a group of dialing buttons 10 are used by a user to operate the facsimile apparatus when connecting with a distant terminal and inputting necessary operating commands.

The control device 5 and a memory device 4 constitute a processing portion for controlling the operations of all components of the facsimile apparatus according to a predetermined procedure for transmitting and receiving image data, instructions inputted by a user and signals from the distant terminal (sending party).

An image storage device 8 stores images transmitted over the telephone network 1 and images read by the image reading device 7. The use of this storage device 8 can realize temporary storage of images read at a high speed by the reading device 7 in synchronism with the printer 6 and further allows implementation of high-level memory-utilizing functions such as memory transmission, transfer and broadcast of image data.

The image storage 8 shown in the block diagram of FIG. 1 is, however, not essential component for carrying out the present invention. So, the invention is embodied, by way of example, as a popular type facsimile apparatus that is not provided with the image storage and uses cut-paper sheets of recording paper for printing thereon received image data.

In the facsimile apparatus, an image signal received from a distant facsimile apparatus (sending party) is expanded by the control device 5 to a string of bits (1, 0) corresponding to black-and-white dots of printable data and then transferred to the printer 6 and every one-line-end signal included in information received together with the image signal is detected and counted by a printed-line counter provided in the memory device 4.

When the end of one received page is detected by information included in the received signal, the number of printed lines counted by the printed line counter is compared to the preset specified number of printed lines. The control device 5 gives a paper-delivery command to a printing device 6 if the count of printed lines is larger than the preset value. If the counted number is smaller than the preset value, the control device does not give the cut-paper sheet delivery command and holds the printed cut-paper sheet on a printing portion of the printing device 6. The specified number of printed lines is preset to the number of printed lines at which printed cut-paper is delivered out of the facsimile apparatus. Only cut-paper having printed lines not less than the preset specified value is delivered according to the above-described logic. The cut-paper sheet is thus effectively used with least unused lines.

In the case of holding printed cut-paper sheet on the printing device 6 as the number of printed lines is smaller than the preset value, the facsimile apparatus is waiting and, on receipt of a next page, starts printing the received data on unused space of the same cut-paper sheet below the last printed line. On completion of printing the data on the cut-paper sheet, it is decided to deliver or hold the cut-paper sheet as described above. This logic is repeated until the number of lines equal to or more than the preset value is printed on the sheet.

It is convenience to a user that a boundary mark is printed between the just printed page and a next printable received page before printing the received next page on the cut-paper held on the printing device. This can be easily achieved in such a way that a broken line is generated by the control device 5 or a boundary image stored as fixed memory data in the memory device 4 is read out to form a printable image and printed on a designated space below the last printed line on the cut-paper sheet.

Figure 2:
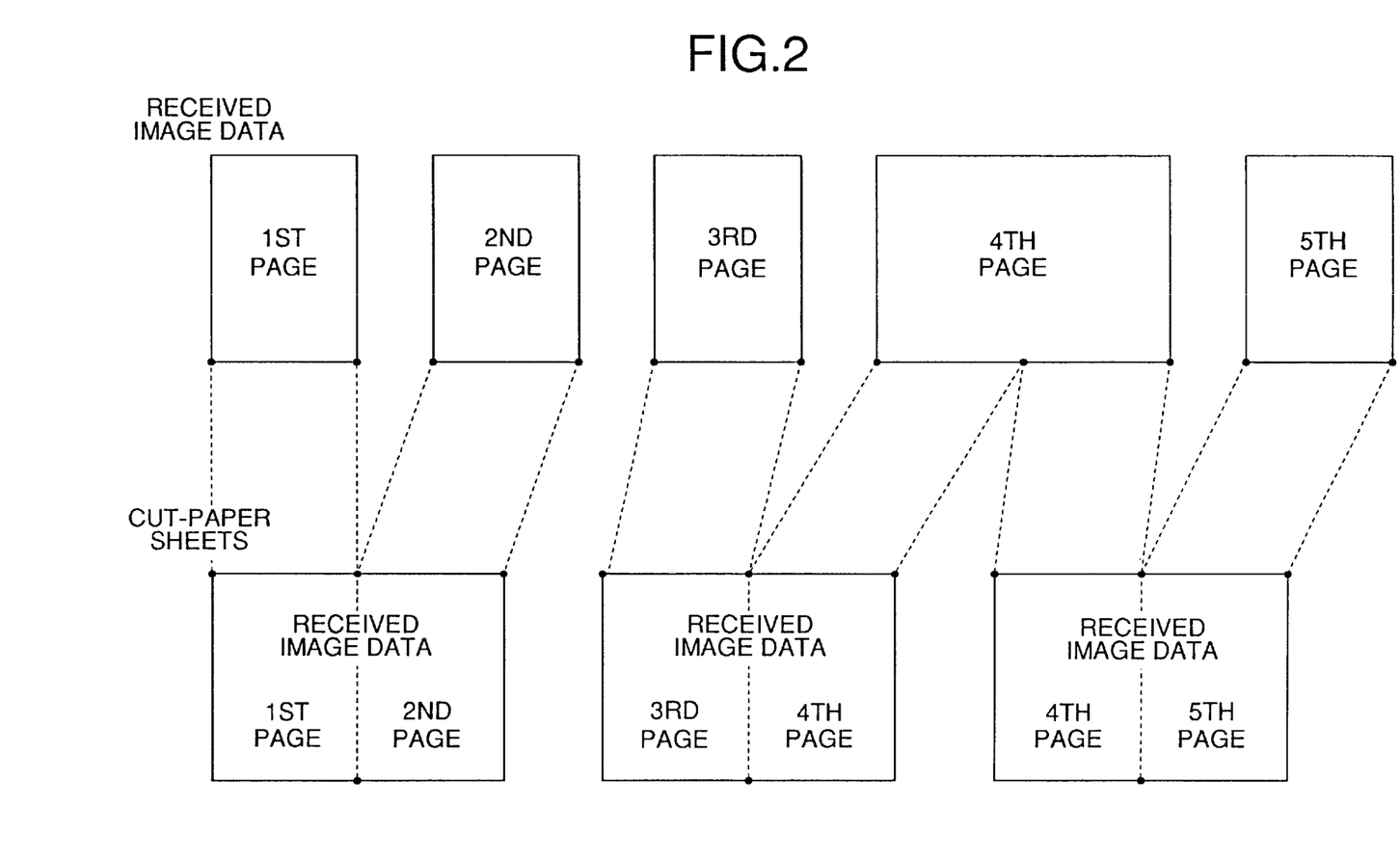
FIG. 2 is a conceptual view showing a relation between received image data and image data printed on a cut-sheets of recording paper.

The procedure for printing a series of image data received page by page will be described below with reference to FIG. 2 depicting a concept of relation between received image data (pages) and image data printed on cut-paper sheets.

As shown in FIG. 2, the received image data are printed in the order of the first page, second page, third page on cut-paper sheets according to the following procedure.

1. The first and second pages of the received image data are printed on the first cut-paper sheet with interposing a broken line in a space between two pages on the sheet.

2. The third page of the received image data is printed on the second cut-paper sheet. Since the cut-paper sheet has still an unused space, the first half of the fourth page of the received image data is printed thereon after putting a broken line indicating the boundary between the pages.

3. The latter half of the received image data is printed to the middle on the third cut-paper sheet. The fifth page of the received image data is then printed on the same cut-paper sheet after putting a broken line indicating the boundary between the pages.

The operation of the facsimile apparatus constructed as shown in FIG. 1 when printing received image data on cut-paper sheets will be described below in detail.

Figures 3, 3A:
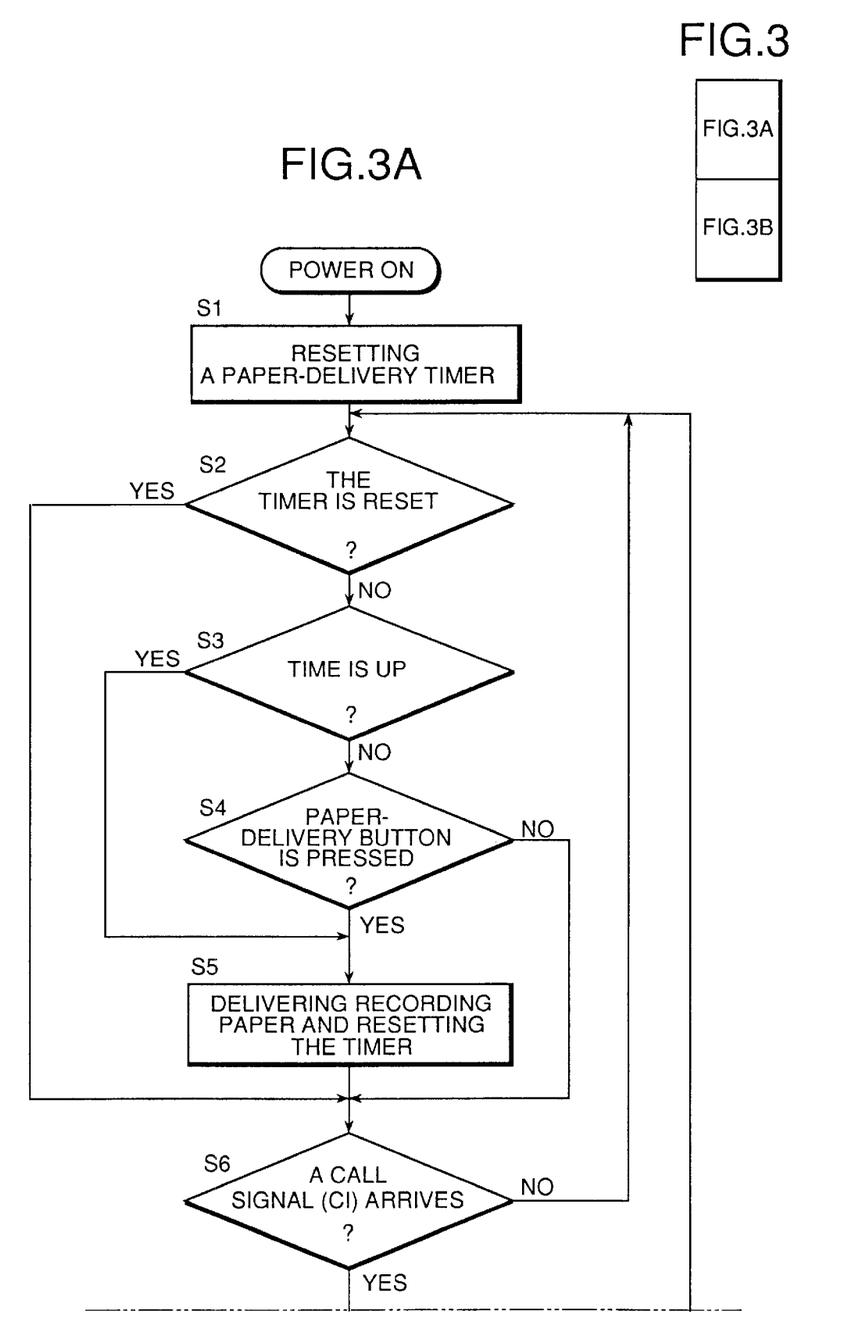
FIG. 3 shows the correct alignment of the drawing sheets for FIGS. 3A and 3B.
FIGS. 3A and 3B are flow charts showing a procedure of printing received image data on recording paper in a facsimile apparatus according to the present invention.
Figures 4, 4A:
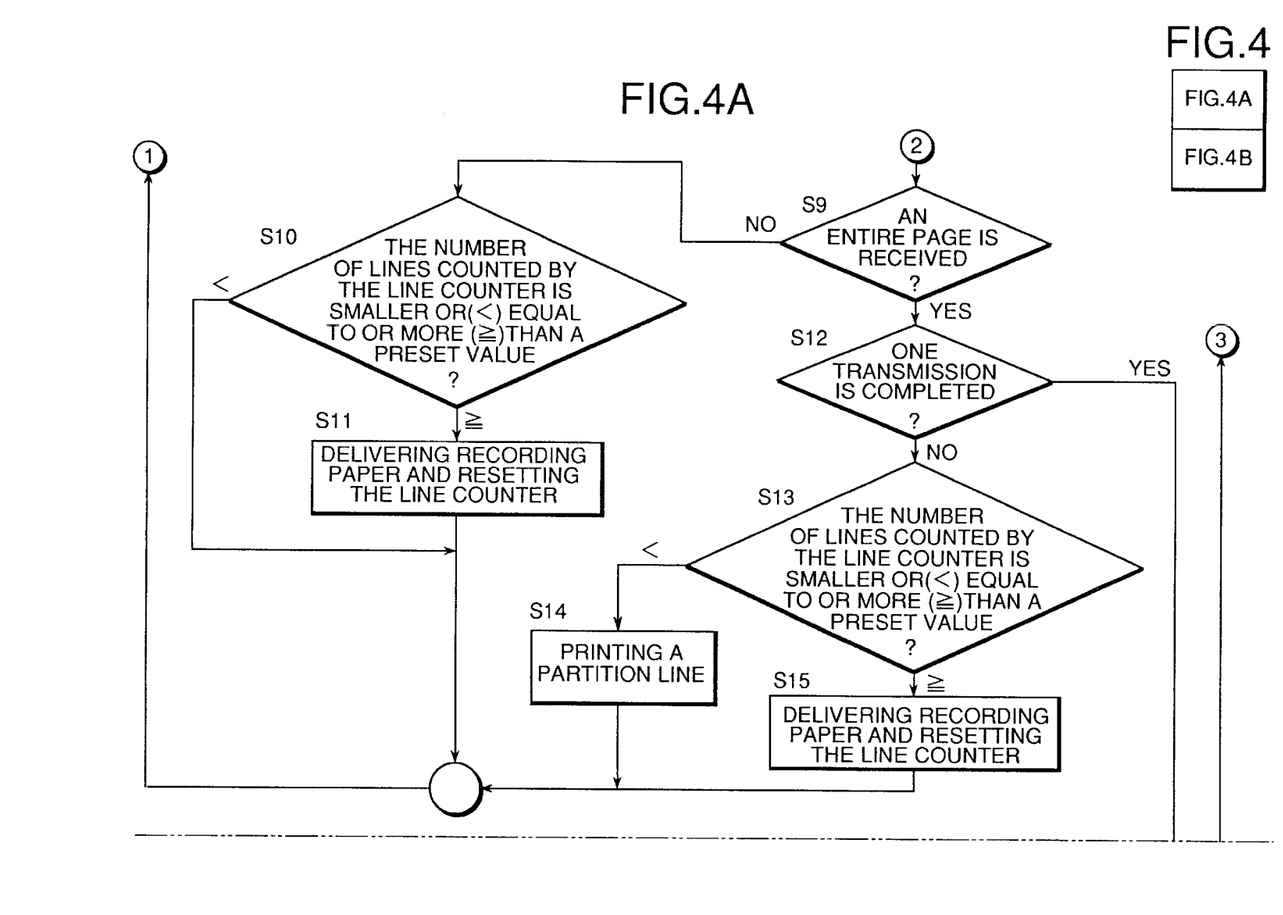
FIG. 4 shows the correct alignment of the drawing sheets for FIGS. 4A and 4B, which follows FIG. 3.
FIGS. 4A and 4B are flow charts showing a procedure of printing received image data on recording paper in a facsimile apparatus according to the present invention.

FIGS. 3 and 4 are flow charts describing an exemplified procedure of printing received image data on cut-paper sheets.

Figure 3B:
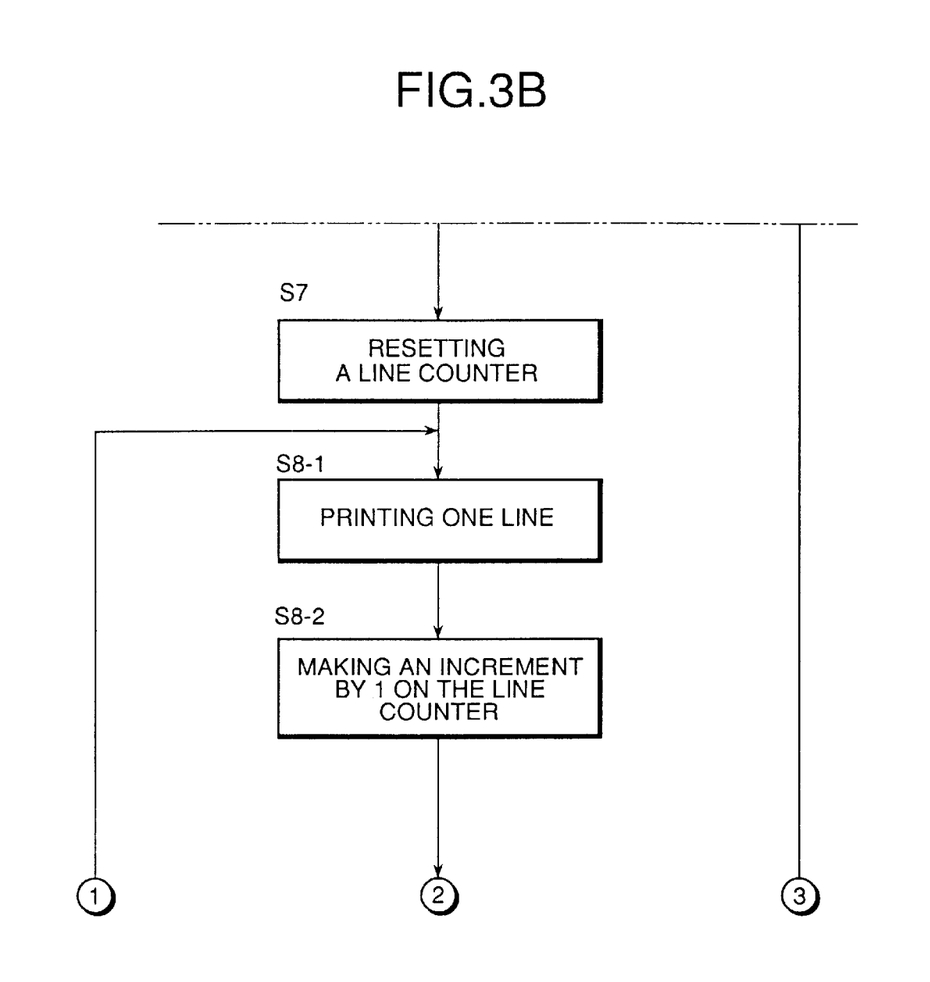

The operation of the apparatus is as follows:

Step S1: A printed-paper-delivery timer mounted in the memory device 4 is reset to initialize (for counting an interval of time to automatically deliver a printed-and-held cut-paper sheet out of the apparatus).

Step S2: It is checked whether the printed-paper-delivery timer is reset or not. The procedure is jumped to Step S6 when the timer was reset at Step S1.

Step S3: It is checked whether the timer gave a time-up signal or not. If so, the procedure is jumped to Step S5.

Step S4: It is checked whether a printed-paper-delivery button (in the operation button group 9) was pressed before the timer generates the time-up signal. If not, the procedure is jumped to Step 6.

Step S5: The printed-paper sheet is delivered out of the apparatus and the timer is reset.

Step S6: It is checked whether a calling signal (CI) from an exchange arrived or not. If not, the procedure is jumped to Step S2.

Step S7: On arrival of a call signal (CI), the line counter for counting the number of lines in a received image data is reset to zero.

Step S8: The received image data is printed by one line on a cut-paper sheet (Step S8-1) and the line counter counts one line to make an increment by 1 on the line counter (Step S8-2).

Step S9: It is judged whether an entire page of the received image data has been received. If so, the procedure is jumped to Step S12.

Step S10: While an entire page of the received image is still not printed, a current count of the line counter is compared with a specified length (expressed by the specified number of printed lines) and, if the count value is smaller than the specified length (preset value), the procedure is returned to Step S8 to repeat the procedure therefrom.

Step S11: While a current page of the received image is still not entirely printed, a current count value of the line counter is compared with a specified length (expressed by the specified number of printed lines) and, if the count value reaches or exceeds the preset value, the cut-paper sheet is delivered out of the apparatus and the line counter is reset to zero. The procedure is then jumped to Step S8 to repeat the procedure therefrom for printing remaining image data on a new cut-paper sheet.

Figure 4B:
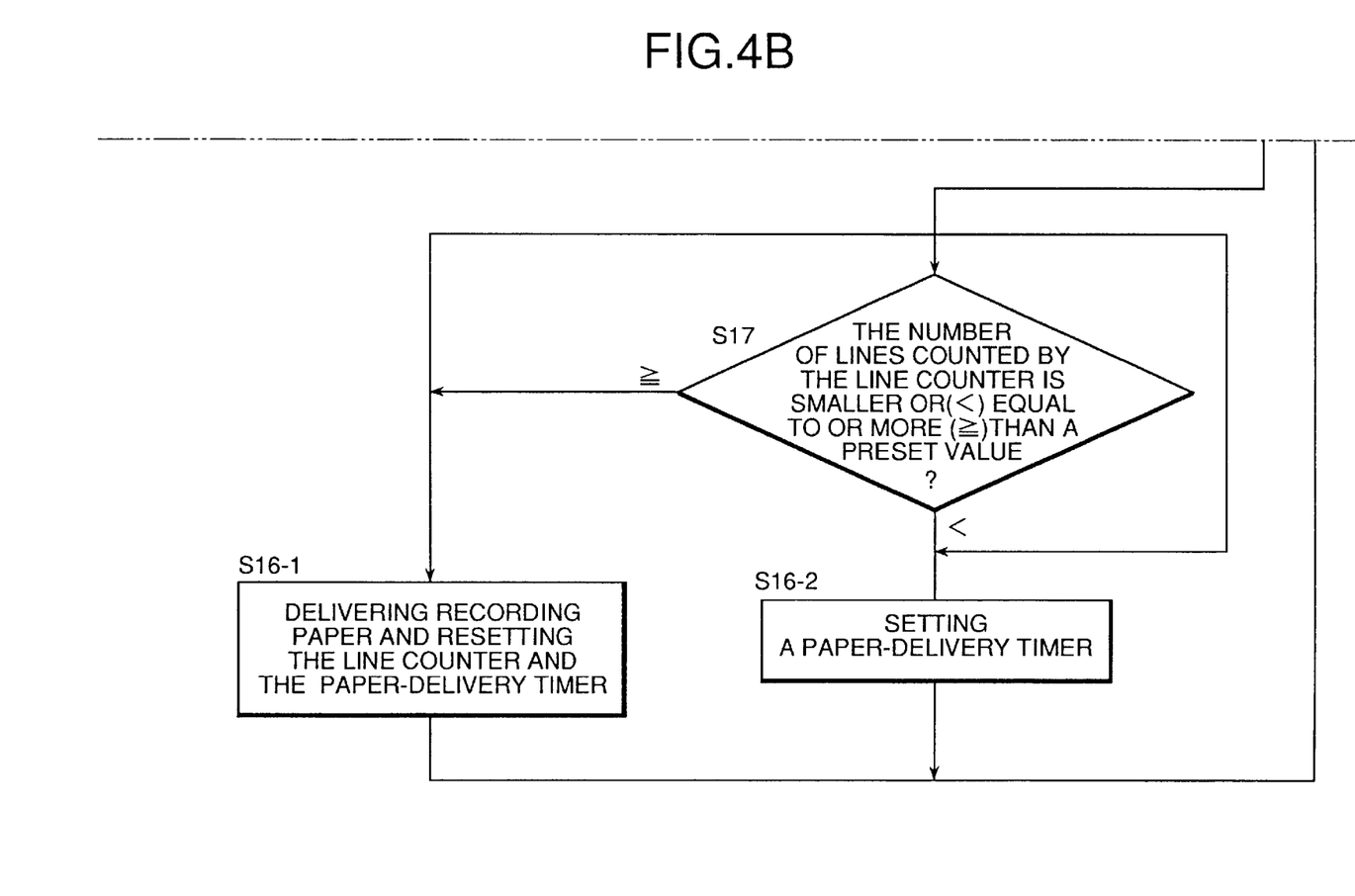

Step S12: On completion of printing an entire page of the received image, it is checked whether the facsimile communication is completed or not. When an entire transmission was completed and the current communication terminated, the procedure is jumped to Step S16 or Step S17.

Step S13: On the condition that an entire page of the received image was received but the communication continues, a current count value of the line counter is compared with a specified length (expressed by the specified number of printed lines) and, if the count value is smaller than the preset value, the procedure is returned to Step S14 to execute the above procedure therefrom.

Step S14: A partition (broken) line is put after the last printed line of the page of the received data on the cut-paper sheet. The process is then returned to Step S8 to execute the above procedure therefrom.

Step S15: On the condition that an entire page of the received image was received but the communication still continues, a current count value of the line counter is compared with a specified length (expressed by the specified number of printed lines) and, if the count value reaches or exceeds the preset value, the cut-paper sheet is delivered out of the apparatus and the line timer is reset to zero. The procedure is then jumped to Step S8 to repeat the procedure therefrom for printing remaining image data on a new cut-paper sheet.

Step S16: On the condition that an entire page of the image data was received and the communication terminated, the cut-paper sheet is delivered out of the apparatus and the line counter is reset to zero and the timer is reset to zero (Step S16-1) or set to a specified value (Step S16-2). The procedure is then jumped to Step S2 to execute the procedure from Step S6 (for waiting for a call signal (CI)) or the procedure from Step S3 (for driving the paper-delivery timer-function).

Step S17: On the condition that an entire page of the image data was received and the communication was also completed, a current count value of the line counter is compared with a specified length (expressed by the specified number of printed lines) and, if the count value is larger than the preset value, the printed cut-paper sheet is delivered out of the apparatus and the line counter and the paper-delivery timer are both reset to zero. The procedure is then jumped to Step S2 to execute the operation process from Step S6 for waiting for a next call signal CI.

In this case, a current count value of the line counter is compared with a specified length (expressed by the specified number of printed lines) and, if the count value is smaller than the preset value, the paper delivery timer is set. The procedure is then jumped to Step S2 to execute the operation procedure from Step S3 for driving the paper-delivery timer-function.

The advantageous effects of the present invention are as follows:

Such a drawback of the prior art that a small amount of image data contained in a page or in a transmission unit transmitted from a sending party may cause uneconomical consumption of recording paper at the receiving party can be solved by the present invention. A facsimile apparatus according to an aspect of the present invention can print pages of received image data received by one or plural communications on a cut-paper sheet if the amount (the number of lines) of received image data is small. Namely, the replacement of a cut-paper sheet with new one is not required until the specified number of lines are printed on the sheet. This makes it possible to maximally use recording paper and save the consumption of recording paper. In addition, the operation time of the printer is also shortened, reducing consumption of energy and material. In case of printing plural pages or communications on a cut-paper sheet, a partition line is marked between the pages or communication units, thus enabling a user to easily discriminate the boundary between them.

According to another aspect of the present invention, it is possible to deliver a printed cut-paper sheet first on completion of receipt of one transmission unit, thus clearly distinguishing between communications. This is convenient for some working conditions.

According to another aspect of the present invention, it is possible to select waiting for arrival of a next call signal (CI) without delivering a printed cur-paper sheet after the receipt of the current communication. This enables a user to effectively use the apparatus according to the practical conditions.

According to another aspect of the present invention, it is possible to decide delivery or holding of a current cut-paper sheet by the number of printed lines (records) on the sheet, thus avoiding uneconomical use of recording paper.

According to another aspect of the present invention, it is possible to automatically deliver a cut-paper sheet out of the apparatus by the effect of a timer that gives a paper-delivery signal when a specified holding time elapsed after receipt of the communication. This can deliver the sheet even if a user forgot the presence of the paper in the apparatus.

According to another aspect of the present invention, it is also possible to forcibly deliver a current cut-paper sheet out of the apparatus by inputting a user's command. This enables the user to remove a cut-paper sheet from the apparatus any time he or she wishes.

The above described functions can be implemented by using simple means not requiring an image storage device. Accordingly, the present invention can be easily embodied as a popular economical type facsimile apparatus provided with the above described functions.

What is claimed is:

1. A cut-paper printing type facsimile apparatus using cut-paper for printing thereon a received image reproduced from a received facsimile signal, comprising:
   a printing means for printing a line image formed from a received facsimile signal on a cut-paper sheet;
   a counting means for counting the number of lines of a line image printed or to be printed by the printing means on a cut-paper sheet; and
   a comparison means for comparing the number of printed lines counted by the counting means with the preset specified number of lines per sheet,
      wherein the printing means replaces a current cut-paper sheet with a new cut-paper sheet by a signal outputted from the comparison means when the number of printed lines is equal to or more than the preset specified number of lines, and
      wherein, if a page-end signal and/or communication-end signal is received and the number of printed lines is less than the preset specified number of lines per sheet, the printing means continues printing on the current cut-paper sheet.

2. A cut-paper printing type facsimile apparatus as defined in claim 1, wherein, in a mode of printing line images of a next received page and/or next received transmission on the current cut-paper sheet, the printing means prints a specified image indicating end of a received page and/or end of a received transmission on a current cut-paper sheet after printing a preceding received page thereon and before printing thereon a line image of a next received page and/or next received transmission.

3. A cut-paper printing type facsimile apparatus as defined in claim 1 or 2, wherein the apparatus is further provided with an instruction means for giving an instruction causing the printing means to deliver a current cut-paper sheet out of the apparatus at the end of receiving the transmission prior to any of the conditions mentioned in claim 1 or 2.

4. A cut-paper printing type facsimile apparatus as defined in claim 1 or 2, wherein the apparatus is further provided with an instruction means for giving an instruction causing the printing means to hold a current cut-paper sheet at the end of receiving the transmission prior to any of the conditions mentioned in claim 1 or 2.

5. A cut-paper printing type facsimile apparatus as defined in claim 1 or 2, wherein the apparatus is further provided with a comparison means for comparing the number of printed lines counted by the counting means with the preset specified number of lines being the number of printed lines at which a cut-paper sheet must be delivered out and it is also provided with an instruction means for giving an instruction causing the printing means to hold a current cut-paper sheet at the end of receiving the transmission according to a comparison signal outputted by the comparison means when the number of printed lines counted by the counting means is smaller than the preset specified number of lines.

6. A cut-paper printing type facsimile apparatus as defined in claim 4, wherein the apparatus is further provided with a timer for giving a signal when a preset specified duration of time elapsed after the instruction causing the printing means not to deliver a current cut-paper sheet, which signal causes the printing means to deliver the cut-paper sheet out of the apparatus.

7. A cut-paper printing type facsimile apparatus as defined in claim 4, wherein the apparatus is further provided with an input means for inputting a command driving the delivery of a cut-paper sheet out of the apparatus, said input means is usable to force the printing means to deliver the cut-paper sheet.

8. A cut-paper printing type facsimile apparatus using cut-paper for printing thereon a received image reproduced from a received facsimile signal, comprising:
   a printing module for printing a line image formed from a received facsimile signal on a cut-paper sheet;
   a counting module for counting the number of lines of a line image printed or to be printed by the printing module on a cut-paper sheet; and
   a comparison module for comparing the number of printed lines counted by the counting module with a preset specified number of lines per sheet,
      wherein the printing module replaces a current cut-paper sheet with a new cut-paper sheet by a signal outputted from the comparison module when the number of printed lines is equal to or more than the preset specified number of lines, and
      wherein the apparatus is further provided with an instruction module for giving an instruction causing the printing module to hold a current cut-paper sheet at the end of receiving the transmission.

9. A cut-paper printing type facsimile apparatus using cut-paper for printing thereon a received image reproduced from a received facsimile signal, comprising:
   a printing module for printing a line image formed from a received facsimile signal on a cut-paper sheet;
   a counting module for counting the number of lines of a line image printed or to be printed by the printing module on a cut-paper sheet; and
   a comparison module for comparing the number of printed lines counted by the counting module with a preset specified number of lines per sheet,
      wherein the printing module replaces a current cut-paper sheet with a new cut-paper sheet by a signal outputted from the comparison module when the number of printed lines is equal to or more than the preset specified number of lines, and wherein the apparatus is further provided with an instruction module for giving an instruction causing the printing module to hold a current cut-paper sheet at the end of receiving the transmission according to a comparison signal output by the comparison module when the number of printed lines counted by the counting module is smaller than the preset specified number of lines.

10. The cut-paper printing type facsimile apparatus as set forth in claim 8 or 9, wherein the apparatus is further provided with a timer for giving a signal when a preset specified duration of time elapsed after the instruction causing the printing module not to deliver a current cut-paper sheet, which signal causes the printing module to deliver the cut-paper sheet out of the apparatus.

11. The cut-paper printing type facsimile apparatus as defined in claim 8 or 9, wherein the apparatus is further provided with an input module for inputting a command driving the delivery of a cut-paper sheet out of the apparatus, the input module being usable to force the printing module to deliver the cut-paper sheet.

* * * * *